United States Patent [19]

Payne et al.

[11] Patent Number: 4,694,192
[45] Date of Patent: Sep. 15, 1987

[54] SIMPLIFIED DEMAND LIMIT CONTROL

[75] Inventors: Peter P. Payne, Wheeling Cook; William T. Pienta, Prospect Heights, both of Ill.

[73] Assignee: Honeywell Inc., Minneapolis, Minn.

[21] Appl. No.: 674,447

[22] Filed: Nov. 23, 1984

[51] Int. Cl.$^4$ .............................................. H02J 3/14
[52] U.S. Cl. ...................................... 307/39; 307/34; 307/35; 307/38; 364/492
[58] Field of Search ...................... 307/29, 34, 35, 36, 307/37, 38, 39, 40, 41, 42, 59, 62, 64, 66, 140, 141; 361/87, 88, 89, 90, 91, 92, 93, 94; 364/492, 493

[56] References Cited

U.S. PATENT DOCUMENTS

| | | | |
|---|---|---|---|
| 3,296,452 | 1/1967 | Williams | 307/35 X |
| 3,862,430 | 1/1975 | Lenhart et al. | 307/35 |
| 3,925,680 | 12/1975 | Dixon | 307/39 |
| 3,932,735 | 1/1976 | Giras | 364/493 X |
| 4,064,485 | 12/1977 | Leyde | 307/39 |
| 4,100,426 | 7/1978 | Baranowski | 307/41 |
| 4,136,393 | 1/1979 | Fox | 364/492 |
| 4,153,936 | 5/1979 | Schmitz et al. | 364/493 |
| 4,167,679 | 9/1979 | Leyde et al. | 307/35 |
| 4,167,786 | 9/1979 | Miller et al. | 364/493 |
| 4,168,491 | 9/1979 | Philips et al. | 307/39 X |
| 4,204,127 | 5/1980 | Carter, II | 307/35 X |
| 4,211,933 | 7/1980 | Hedges et al. | 307/35 |
| 4,213,058 | 7/1980 | Townsend | 307/40 |
| 4,213,182 | 7/1980 | Eichelberger et al. | 364/493 |
| 4,216,384 | 8/1980 | Hurley | 307/39 |
| 4,217,646 | 8/1980 | Caltagirone et al. | 364/493 |
| 4,247,786 | 1/1981 | Hedges | 307/35 |
| 4,283,635 | 8/1981 | Balmer | 307/35 |
| 4,324,987 | 4/1982 | Sullivan, II et al. | 307/35 |
| 4,336,462 | 6/1982 | Hedges | 307/35 |
| 4,345,162 | 8/1982 | Hammer et al. | 307/39 |
| 4,357,665 | 11/1982 | Korff | 364/492 |
| 4,360,881 | 11/1982 | Martinson | 364/493 |
| 4,363,101 | 12/1982 | Czerniejewski | 307/35 X |
| 4,367,414 | 1/1983 | Miller et al. | 307/38 |
| 4,413,189 | 11/1983 | Bottom | 307/35 X |
| 4,463,432 | 7/1984 | Carter, II | 307/39 X |
| 4,489,386 | 12/1984 | Breddan | 307/35 |
| 4,510,398 | 4/1985 | Culp et al. | 307/35 |
| 4,549,274 | 10/1985 | Lerner et al. | 307/39 X |

Primary Examiner—William M. Shoop, Jr.
Assistant Examiner—Shik Luen Paul Ip
Attorney, Agent, or Firm—Donald J. Lenkszus

[57] ABSTRACT

A demand limit control system for maintaining power consumption of loads within a building below an upper demand limit, the upper demand limit being separated from a lower demand limit by a deadband, the system having a power demand controller responsive to power consumption for providing a controller output signal ramping up when the power consumption is above the upper demand limit, remaining substantially constant when power consumption is between the upper and lower demand limits, and ramping down when the power consumption is below the lower demand limit, and a plurality of demand controlled loads each connected to the power demand controller and each responding to a different threshold value of the controller output signal such that each load is conditioned to turn off when the controller output signal is above the threshold and is conditioned to turn on when the controller output signal is below the threshold.

9 Claims, 8 Drawing Figures

SIMPLIFIED DEMAND LIMIT CONTROL

BACKGROUND OF THE INVENTION

The present invention relates to a simplified demand limit control and, more particularly, to a simplified demand limit control for maintaining instantaneous energy consumption of the loads within a building below a predetermined value.

Public electric utility companies are committed to provide suitably sized supply equipment to meet the needs of their customers. This equipment must be sized to not only handle the ordinary everday usage of electricity but must also be designed to meet the peak rates of electricity consumed by the utility's customers. Thus, if one customer has an abnormally high demand for a short period of time, the utility must provide heavier supply equipment to satisfy the short term high demands of that customer than would otherwise be needed to supply the demands of the other customers even though the other customers may essentially have the same average power consumption.

The utility typically recovers the cost of providing this heavier supply equipment by monitoring their customers' rate of power consumption and charging those customers which have high peak demands a surcharge which is dependent upon the maximum rate used in a given billing period. This surcharge is an added expense to the total power usage and is perceived as a part of the cost of energy because the utility has had to provide the heavier supply equipment to satisfy these higher demands. Therefore, it is not surprising that the commercial building industry's interest in energy conservation has included various routines for leveling and limiting electrical demand.

Many types of systems have been introduced in order to limit electrical consumption within a building to avoid excessive power charges. Typical systems put the decision making authority for deciding which loads to be shed or added in a central controller. In this arrangement, the central controller through a power meter monitors power consumption within a building and determines what the load within the building must be in order to maintain power consumption below a demand limit established by the user for his facility. The demand limit is selected by the user at a level low enough to minimize the surcharge imposed upon him by the utility. Such systems can either be home run wherein the central controller has a separate control line for each of the loads connected to it or can be daisy chained in such a fashion that the central controller must address each load and communicate to the load the controller's decision as to whether or not the load should be shed or added.

In either case, these systems are complex and are typically used where a great many loads are to be so controlled. Furthermore, the decision making process is done within the controller and is not done at the individual loads. However, copending application Ser. No. 512,519 filed on July 11, 1983 discloses a system in which the decision making authority is removed from a single processor and instead resides in a plurality of load controlling modules. In this system, the power consumption rate is broadcast over a communication channel and is received by each of load controlling modules. To each load controlling module is connected a plurality of loads. Each load controlling module determines based upon current power consumption whether or not it should shed a load. The modules are arranged in priority order and each load within a module is arranged in priority order. Thus, module 1 will shed its load 1 if it determines that power consumption is too high. Thereafter, module 2 will then determine whether or not it should shed its first load if power consumption still remains too high, and so on. This system is again directed to buildings which have many loads to be controlled. Moreover, such a system does not allow the individual loads to make their own decisions as to whether or not they should be shed or added.

SUMMARY OF THE INVENTION

The present invention solves many of these problems by providing a controller which produces a controller output signal which changes (for example, as by ramping) in a first direction when power consumption is above an upper demand limit, the upper demand limit being separated from a lower demand limit by a deadband, which changes in a second direction when power consumption is below the lower demand limit, and which does not change when power consumption is between the two demand limits, a communication channel for carrying the controller output signal, and a load connected to the communication channel and responsive to the controller output signal, the load having states of energization and deenergization, the load having one of said states when the controller output signal is above a threshold value individual to that load and having the other of its energization states when the controller output signal is below the threshold.

BRIEF DESCRIPTION OF THE DRAWINGS

These and other features and advantages will become more apparent from a detailed consideration of the invention when taken in conjunction with the drawings in which:

FIG. 6 shows a logic diagram which can be used by the individual loads, connected to the controller of FIG. 5, for deciding when to turn off and when to turn on;

DETAILED DESCRIPTION

Figure 1:
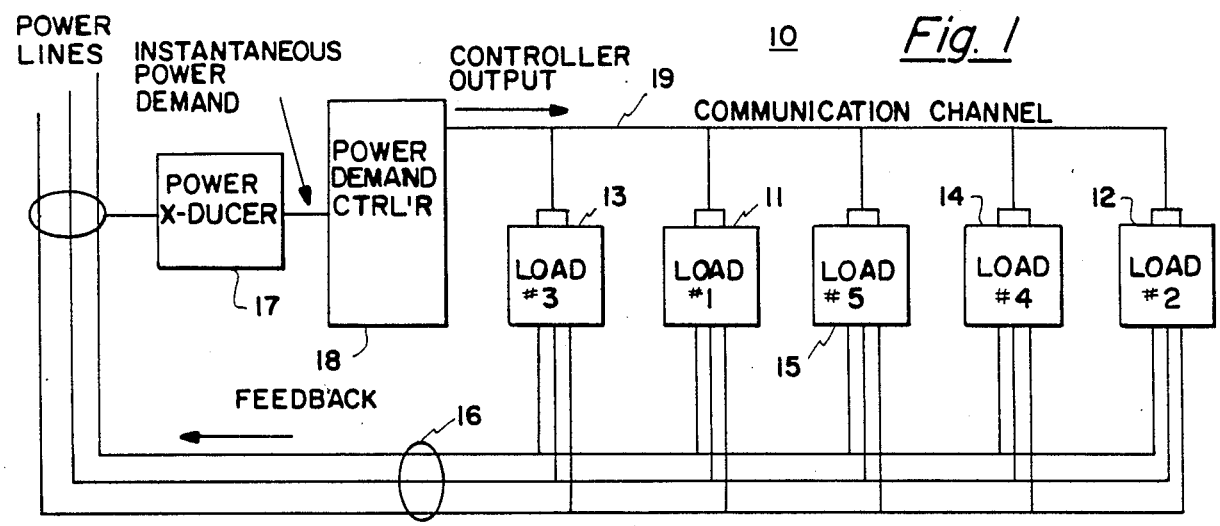
FIG. 1 shows a schematic diagram of a power demand control system according to the present invention.

As shown in FIG. 1, a plurality of loads 11-15 within building 10 are supplied with power over power lines 16. The power consumption of loads 11-15 is monitored by transducer 17 which provides a power consumption signal to power demand controller 18. Power demand controller 18 then supplies a demand controller output signal to communication channel 19 to which each of the loads is connected. Loads 11-15 monitor the demand controller output signal in order to determine individually whether they should shed or add themselves from or to power lines 16.

The demand controller output signal on communication channel 19 may essentially be an analog signal. Each load compares this demand controller output signal to a threshold having a unique value dependent upon the priority of the load to determine whether the demand controller output signal exceeds (or falls below if the system is made to function in the opposite direction) the threshold. If the power demand control output signal exceeds (or falls below) the threshold, the load will be deenergized if such local priorities as minimum on time are satisfied. If the demand control output signal does not exceed the threshold the load may either be energized or be conditioned to be controlled by other events or program routines.

As can be seen from FIG. 1, the loads are numbered such that load #1 will be the first load to turn off when power consumption exceeds the demand limit, load #2 will turn off next if power consumption still exceeds the demand limit and so on. The loads will be added in reverse order.

Figure 2:
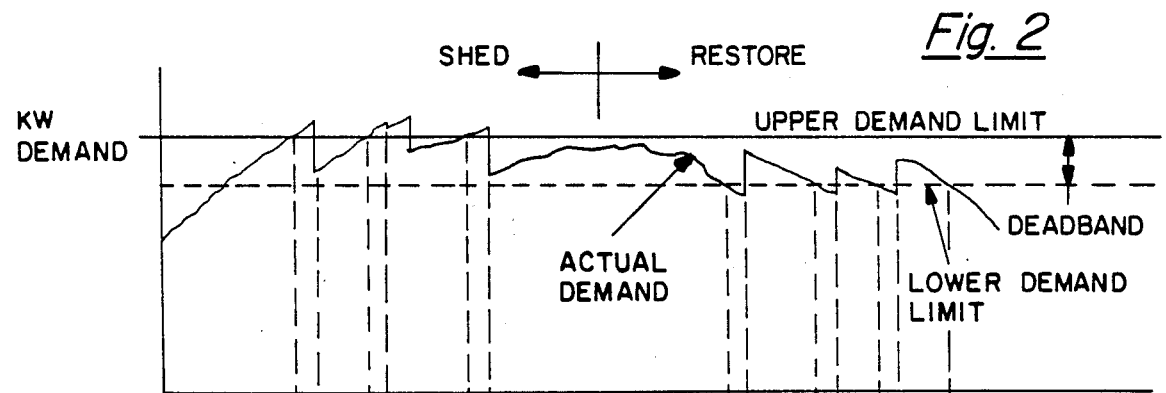
FIG. 2 shows by way of example a theoretical power consumption profile for a building.

FIG. 2 shows an example of power consumption as it may occur within a building. A demand limit is established by the system so that peak demands may be kept as low as possible to reduce the peak power consumption surcharges imposed by the utilities upon their customers. The demand limit as shown in FIG. 2 actually comprises an upper demand limit and a lower demand limit separated by a deadband. If power consumption is above the upper demand limit, loads should be shed. If power consumption is below the lower demand limit loads can be added (although loads may not necessarily be energized if other conditions require that the loads be deenergized). If power consumption is within the deadband, no decision as to shedding or adding is made.

Figure 3:
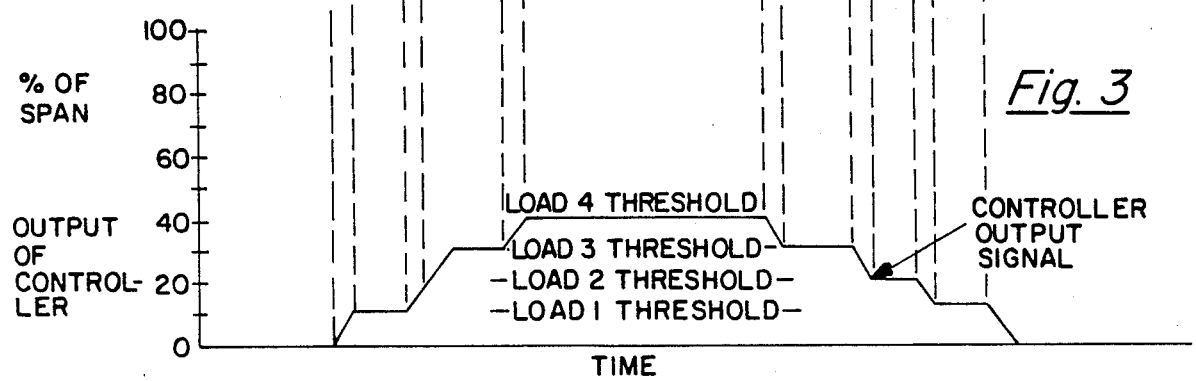
FIG. 3 shows the signal produced by the controller of FIG. 1 as a function of the power consumption profile shown in FIG. 2.

Accordingly, FIG. 3 shows the demand controller output signal supplied by demand controller 18 to communication channel 19. In the specific example, power demand controller 18 will supply a demand controller output signal which may be an integrating ramp without any proportional control component. Thus, as long as power consumption is above the upper demand limit, the demand controller output signal will continue to ramp up and if power consumption is below the lower demand limit, the demand controller output signal will continue to ramp down. If power consumption is between the upper and lower demand limits, i.e. within the deadband, the demand controller output signal will hold substantially steady.

Thus, as shown in FIGS. 2 and 3, at the first instance that power consumption exceeds the upper demand limit, the demand controller output signal on communication channel 19 will begin ramping up and will continue to ramp up until the threshold level of load 11 is achieved. At this point, load 11 is shed which, if it was previously on, will result in an instantaneous power consumption reduction. This reduction according to FIG. 2 may cause power consumption to fall within the deadband at which point the demand controller output signal will hold steady.

If power consumption continues to increase and then exceed the upper demand limit, the demand controller output signal will again begin ramping up until the next threshold for the next load 12 is achieved at which time the next load will attempt to shed. According to the example shown, however, this will not materially affect power consumption since, for example, the load was not on or it cannot be shed due to other overriding priorities (i.e. minimum on time has not been satisfied) or is too small to cause KW demand to fall within deadband. Thus, power consumption will still remain above the upper demand limit such that the demand controller output signal will continue to ramp up until the load 13 threshold is reached. At this point, load 13 is shed and the instantaneous power consumption drops below the upper demand limit but will continue to increase. As long as the power consumption is within the deadband, the demand controller output signal will hold steady. When the power consumption next exceeds the upper demand limit, the demand controller output signal will again begin ramping up until the load 14 threshold is achieved. At this point, load 14 is shed which reduces power consumption to within the deadband. As long as power consumption is within the deadband, the demand controller output signal will hold steady.

When the power consumption drops below the lower demand limit, the demand controller output signal will begin ramping down until it falls below the load 14 threshold at which time load 14 can be reenergized which will cause power consumption to move back to within the deadband range. When power consumption next drops below the lower demand limit, the demand controller output signal will begin ramping down until it falls below the load 13 threshold at which time load 13 is reenergized and so on.

All loads monitor the demand controller output signal on the communication channel. Each load has assigned to it a separate threshold which establishes its relative priority for purposes of adding/shedding. The lowest priority load (the first to be shed and the last to be added) has the lowest shed threshold point.

Feedback to demand controller 18 is accomplished indirectly by the monitoring of power consumption on power line 16 by transducer 17. The watt transducer immediately senses power consumption changes and communicates these changes to demand controller 18.

For stable control, a load once shed should cause demand to fall within a deadband region preventing it from immediately being restored. This function is performed by the deadband zone between the upper demand limit and the lower demand limit as shown in FIG. 2. For this reason, the deadband must be slightly greater than the largest energy consuming sheddable load such that, if the largest energy consuming sheddable load is shed, the instantaneous power consumption will not drop from above the upper demand limit to below the lower demand limit.

The functions of FIGS. 2 and 3 together with the system shown in FIG. 1 can be implemented in a variety of ways. Demand controller 18 can be a microprocessor with appropriate analog circuitry for monitoring the power consumption signal supplied by transducer 17 for providing the requisite ramping type signal on communication channel 19. Loads 11-15 can contain simple switches which are set to operate at different analog setpoint values. Some loads may require additional functions such as minimum on, minimum off, maximum off, comfort control limits and other local overriding capability. However, the logic for these functions can easily be provided at the load with the load logic being no more complex than is necessary to meet the needs of the individual loads.

Figure 4:
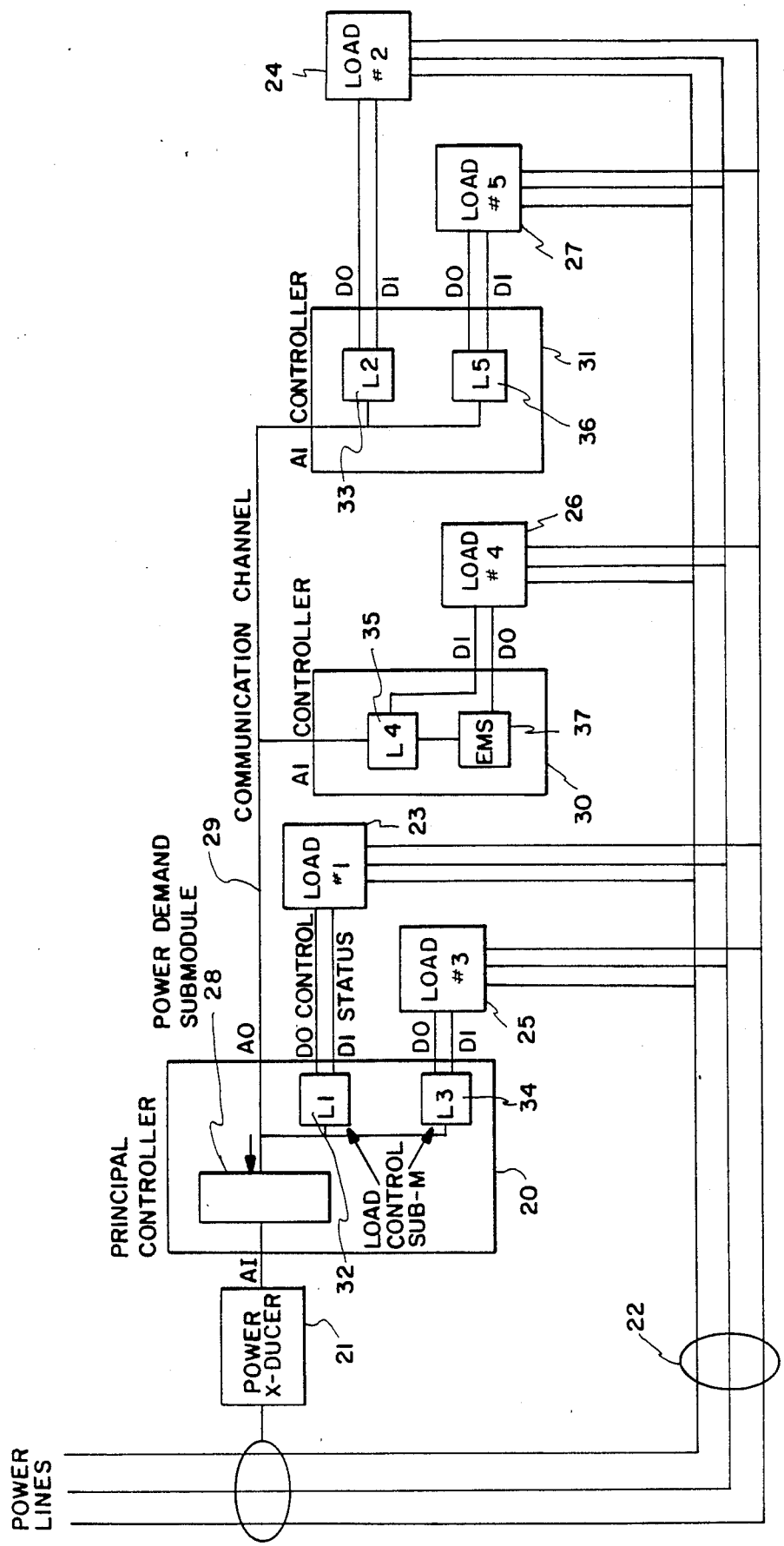
FIG. 4 shows an example of how the system shown in FIG. 1 can actually be implemented using the Honeywell Excel system.

These functions can also be provided within Excel manufactured by Honeywell and shown in block form in FIG. 4. In this system, one controller (nearest the power meter) is selected as the principal controller. The Excel system functions without what is normally a central processing unit. Each of the controllers is capable of functioning as a stand alone system. Thus, one of the controllers located nearest the power transducer is designated the principal controller.

Accordingly, in FIG. 4, principal controller 20 receives instantaneous power information from power transducer 21 which monitors the power consumption of loads 23–27 by monitoring power lines 22. A computerized power demand submodule may be programmed to compare the output from power transducer 21 to a setpoint for generating the demand controller output signal which ramps up if power consumption exceeds an upper demand limit, ramps down if power consumption falls below a lower demand limit, and holds substantially steady if power consumption remains within the deadband between the upper demand limit and the lower demand limit.

The demand controller output signal is carried by communication channel 29 which directly links principal controller 20 to the other controllers 30–31 which, using load control submodules 32–36 compare their preset threshold values with the demand controller output signal to determine whether their associated loads, 23–27 respectively, can be shed or added.

These loads may be disconnected when the comparison indicates that the load should be shed providing load priorities permit but, in at least some cases, are conditioned to be controlled by other control modules when it is determined by this comparison that the load can be added. For example, controller 30 has an energy management module 37 located therein which will control load 26 when load control submodule 35 determines that load 26 can be added but may not be functional when load control submodule 35 determines that load 26 should be shed dependent upon whether the energy management module has a higher priority than demand load control submodule 35 or unless, of course, some other requirement for the load, such as it has not yet been on for a predetermined minimum amount of time, requires contrary control. Accordingly, if a load that is instructed to shed is not sheddable, it simply will not shed at that time and the power demand setpoint will not be satisfied. The controller demand output signal will then continue to climb and will instruct the next load to shed. When, at a future time, the previously unshed load becomes sheddable (minimum on time satisfied, for example), it will automatically shed assuming that the demand controller output signal has remained above the threshold level for that load. If the shedding of the previously unshed load brings the total power rate below the deadband, then the higher priority load previously shed in its place will be allowed to restore while the lower priority load remains off. In this way, the demand limit is preserved while still honoring minimum and maximum control times and load priority. If all sheddable loads are off and demand still exceeds setpoint, an alarm is triggered by 28 indicating the need for manual intervention.

Figure 5:
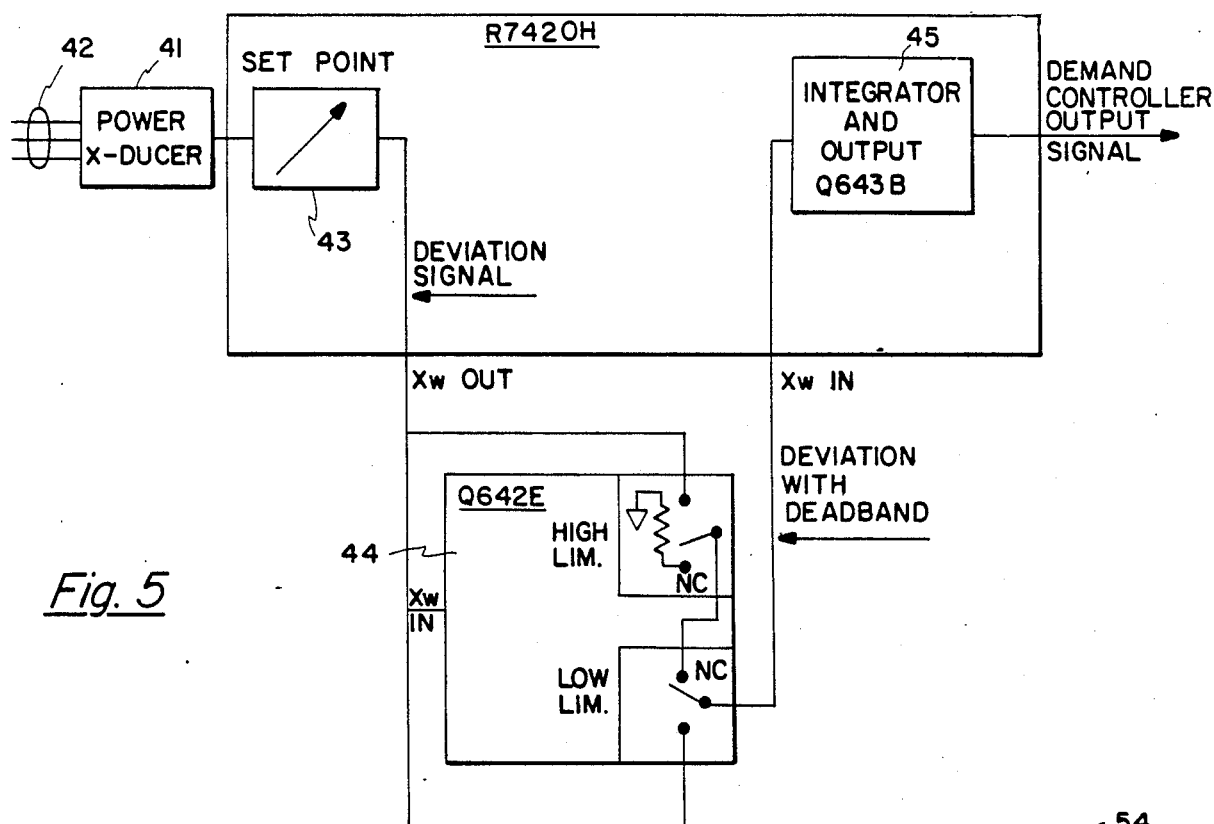
FIG. 5 shows how the controller of FIG. 1 can actually be implemented using the Honeywell Micronik 100 system.

These same general control functions can be applied by using electric or pneumatic control functions. FIG. 5 shows an electronic or electrical system which can perform this function. In the case of FIG. 5, the Honeywell Micronik 100 can be used for implementing this control function. Again, power transducer 41 monitors power consumption over lines 42. The output signal from transducer 41 is compared with a setpoint value defining an upper demand limit stored at 43 and produces a deviation signal which is supplied to the input of module 44. Module 44 provides the deadband between the upper demand limit and the lower demand limit. This module has two single pole, double throw output relays which are interconnected to provide essentially a three position output, a restore output when the output from transducer 41 is below setpoint minus the deadband, a hold output when the output from power transducer 41 is within the deadband, and a shed output when the output from transducer 41 is above setpoint. The output from module 44 is then connected to an integrator 45 which will ramp up for a shed output from module 44, hold substantially steady for a hold output from module 44, and will ramp down for a restore output from module 44. (To accomplish this, resistor R8 in the integrator should be removed which eliminates the proportional effect of this integrator so that the integrator becomes a straight integrator.)

Figure 6:
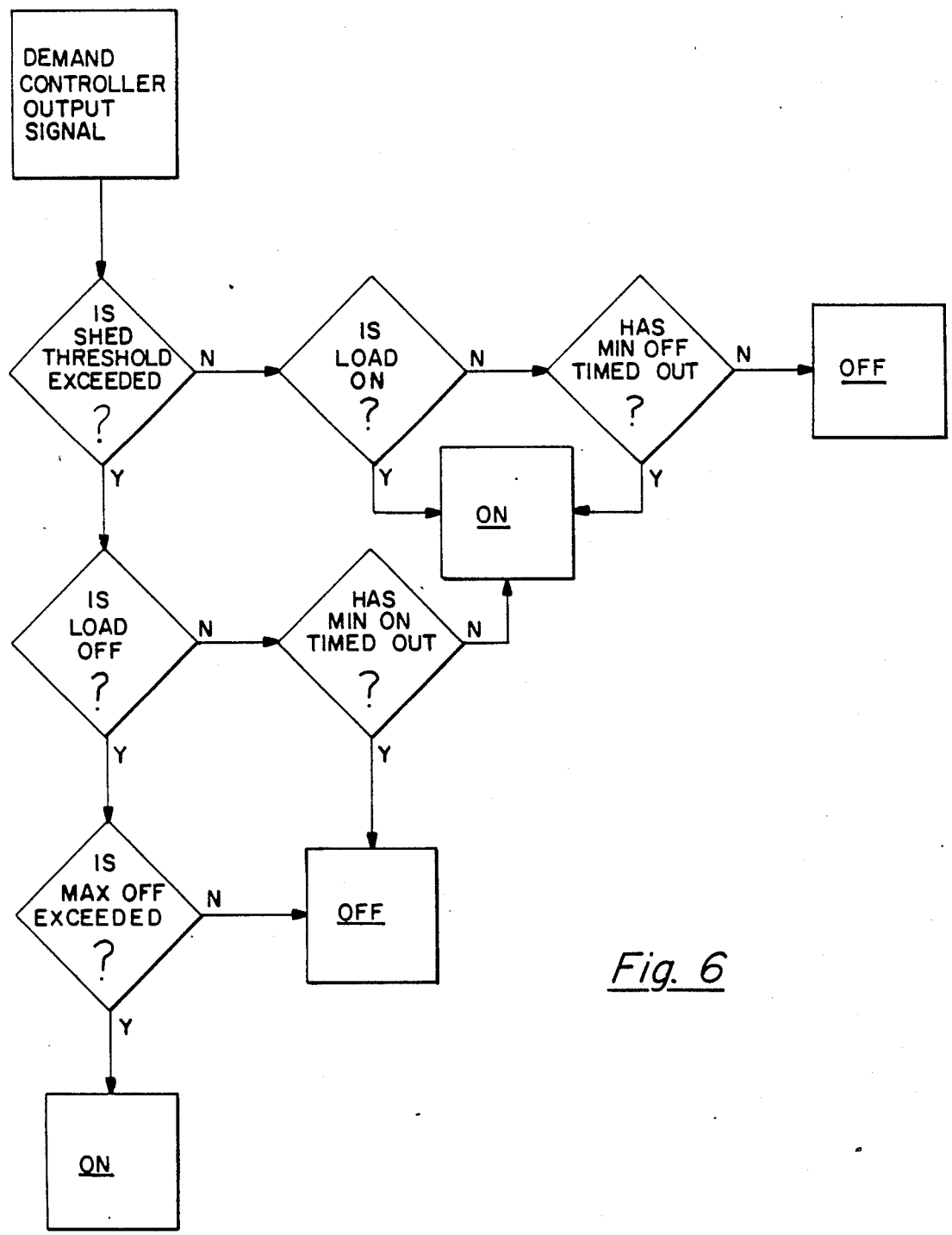

This signal can then be sent over two wires throughout the building housing the various loads. As with Excel, each sheddable load requires its own load control logic to properly assign its relative shed priority and to provide any other required function such as maximum and minimum control times. FIG. 6 shows the control logic that the local load control panel connected to the demand controller output signal of FIG. 5 must have.

According to FIG. 6, the load will receive the demand controller output signal and compare this signal to its own threshold value stored as a setpoint to determine whether it is that load's turn to be shed. If the demand controller output signal is below the threshold, then that load's turn has not come to shed at which point the load will decide whether it is to be on or not. If the load is on it will stay on but if it is not on the load control logic will next test whether or not its minimum off time has timed out. If it has, then the load will turn on and if not the load will remain off.

On the other hand, if it is the load's turn to shed, the load control logic will next determine whether or not it is off. If it is not off, it will determine whether its minimum on time has timed out. If so, the load will turn off and if not the load will remain on. If the load is off, however, the load control logic will next determine whether or not its maximum off time has been exceeded. If not, the load will remain off but if the maximum off time has been exceeded the load will turn on. Thus, various functions such as load status, minimum off, minimum on and maximum off are provided.

Figure 7:
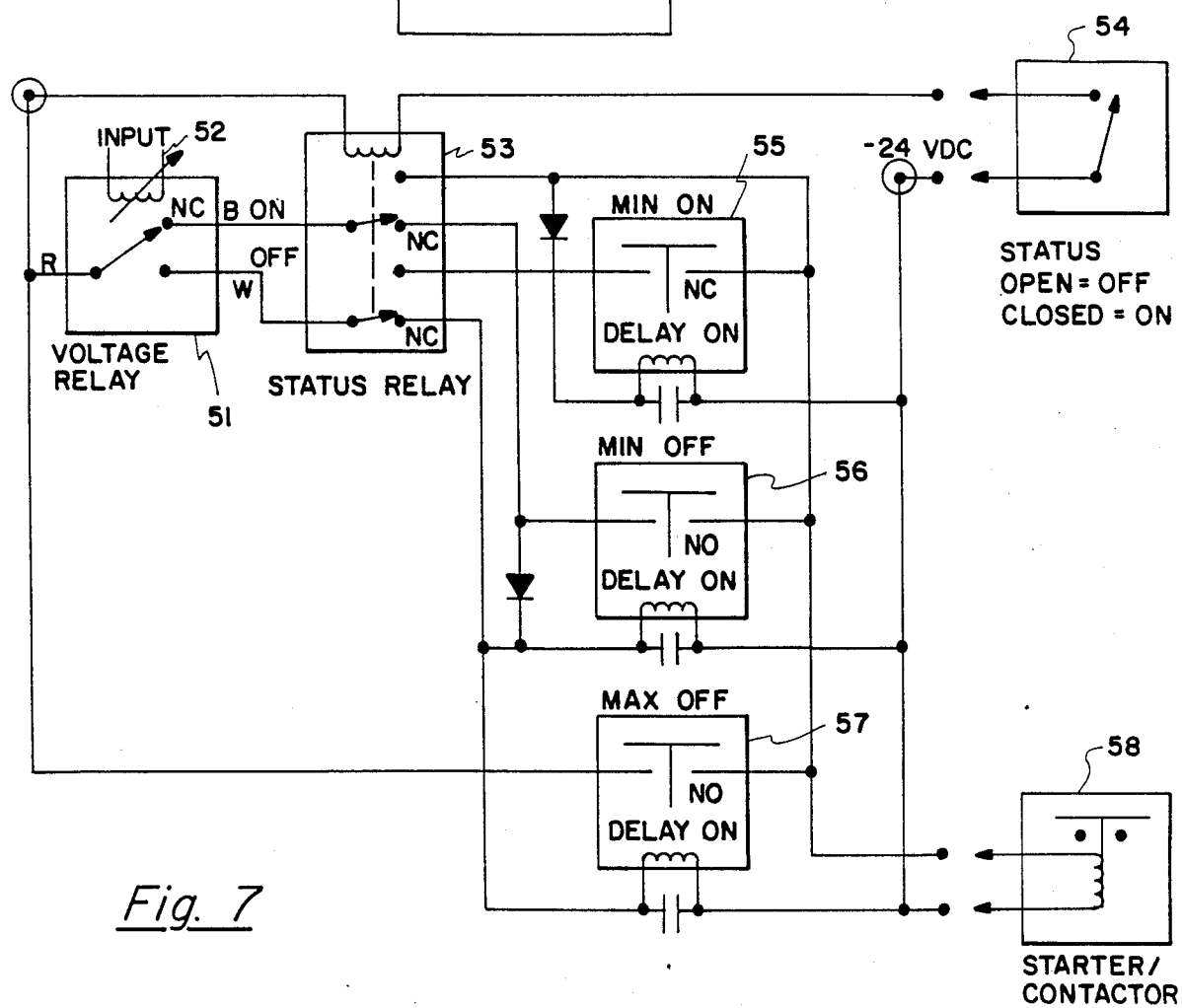
FIG. 7 shows the load control logic which can be connected to the controller shown in FIG. 5 (or in FIG. 8 by replacing relay 51 with a P/E switch); and, FIG. 8 shows a pneumatic approach for the power demand controller 18 shown in FIG. 1.

FIG. 7 shows a hardware approach for providing the functions shown in FIG. 6. Accordingly, voltage responsive relay 51 has a relay coil 52 connected to the communication channel for receiving the demand controller output signal shown in FIG. 5. The voltage control relays 51 at the various loads can be set to respond to a different threshold to establish the priority for shed/add purposes. The output from relay 51 is connected through relay 53 which responds to the status of the load itself from status switch 54. Status switch 54 can be a condition responsive switch, for example, for determining whether the load associated with the load control module as shown in FIG. 7 should be on or off in response to a condition.

Time delay relay 55 provides for minimum on time for the load associated with the apparatus in FIG. 7, time delay relay 56 provides for minimum off time, and time delay relay 57 provides for maximum off time. In this way, not only is the load which is turned on and off by relay 58 in response to the other relay shown in FIG. 7, added or shed in response to power consumption, but it can also be controlled by energy management or other factors.

Figure 8:
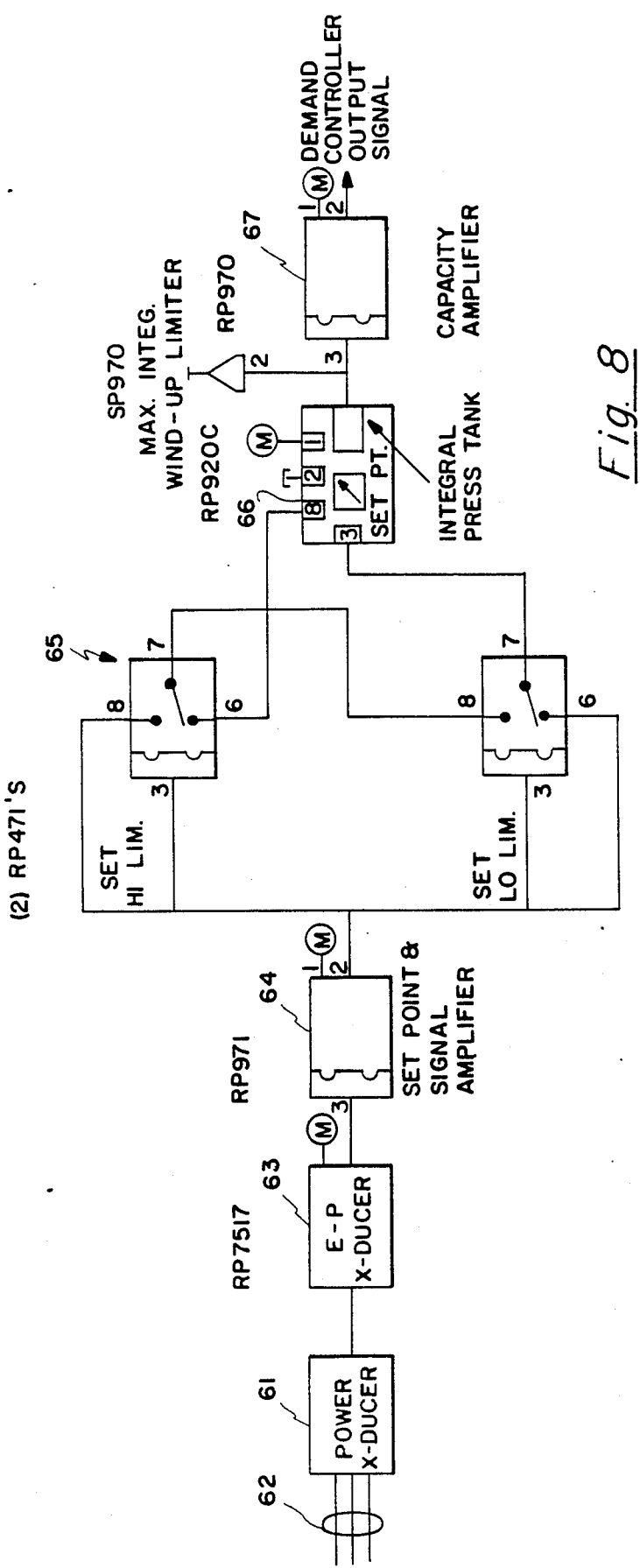

FIG. 8 shows another alternative in which the demand controller output signal can be provided by pneumatic circuits. Watt transducer 61 monitors power consumption on lines 62 and provides an output signal which is transduced by transducer 63 into a pneumatic signal. The output from transducer 63 is then supplied to a setpoint amplifier 64 which compares the output from transducer 63 to a setpoint and will provide a deviation signal accordingly. This deviation signal is supplied through deadband circuit 65 for providing a deadband signal as an input to integrator 66. Integrator 66 will provide a signal which ramps up when power consumption is above the upper demand limit, will hold substantially steady when power consumption is between the upper demand limit and the lower demand limit, and will ramp down when power consumption is below the lower demand limit.

The output from integrator 66 is amplified by amplifier 67 and is supplied as the demand controller output signal to a pneumatic communication channel. A pneumatic-to-electric switch with adjustable setpoint can functionally replace relay 51 of FIG. 7. The remaining load control logic can be performed electrically as described in FIG. 7.

The embodiments of the invention in which an exclusive property or right is claimed are defined as follows:

1. A demand control system for maintaining power consumption of loads within a building below a demand limit comprising:
   power demand controller means responsive to power consumption of said loads for providing a controller output signal changing in a first direction when said power consumption is above said demand limit and changing in a second direction when said power consumption is below said demand limit;
   a communication channel connected to said power demand controller means for carrying said signal; and,
   at least one demand load controlling means connected to said communication channel to be responsive to a threshold of said controller output signal, said demand load controlling means having a deenergization state and an energization state, said demand load controlling means capable of having one of said states when said controller output signal is above said threshold and the other of said states when said controller output signal is below said threshold.

2. A demand control system for maintaining power consumption of loads within a building below an upper demand limit, said upper demand limit being separated from a lower demand limit by a deadband, said system comprising:
   power demand controller means responsive to said power consumption for providing a controller output signal ramping in a first direction when said power consumption is above said upper demand limit, remaining substantially constant when said power consumption is between said upper and lower demand limits, and ramping in a second direction when said power consumption is below said lower demand limit;
   a communication channel connected to said power demand controller for carrying said signal; and,
   a plurality of demand load controlling means each of which responds to a different threshold value of said controller output signal and each of which has at least an energization state and a deenergization state, each of said demand controlling means capable of having one of said states when said controller output signal is above said threshold and the other of states when said controller output signal is below said threshold.

3. The system of claim 2 wherein said controller output signal ramps up when said power consumption is above said upper demand limit, remains substantially constant when said power consumption is between said upper and lower demand limits, and ramps down when said power consumption is below said lower demand limit.

4. The system of claim 3 wherein each of said loads is conditioned to turn off when said controller output signal is above said threshold and is conditioned to turn on when said controller output signal is below said threshold.

5. The system of claim 4 wherein said power demand controller means comprises an integrator for providing said ramping signal.

6. The system of claim 5 wherein said power demand controller means comprises a power transducer for monitoring power consumption of the loads within said building, and a deadband means connected to the power transducer, said deadband means providing a deadband having said upper demand limit and said lower demand limit, said integrator connected to said deadband means for providing a signal which ramps up when said power consumption is above said upper demand limit, holds steady when said power consumption is within said deadband, and ramps down when said power consumption is below said lower demand limit.

7. An apparatus for use in a demand control system for producing a controller output signal useful in a system to maintain power consumption below an upper demand limit, said upper demand limit being separated from a lower demand limit by a deadband, said apparatus comprising:
   power transducer means responsive to power consumption of loads within a building for providing a power consumption output signal dependent upon said power conumption; and,
   power demand controller means connected to said power transducer means and responsive to said power consumption output signal for providing a controller output signal ramping in a first direction when said power consumption is above said upper demand limit, holding substantially steady when said power consumption is between said upper demand limit and said lower demand limit, and for ramping in a second direction when power consumption is below said lower demand limit.

8. A load controlling means connectable to a communication channel for receiving a power demand signal from a controller, said signal ramping in a first direction when power consumption of loads within a building is above an upper demand limit, holding substantially steady when power consumption is between said upper demand limit and a lower demand limit, and ramping in a second direction when said power consumption is below said lower demand limit, said load controlling means comprising:

connecting means for connecting said load controlling means to a communication channel; and, threshold means connected to said connecting means and responsive to a threshold of said power demand signal capable of deenergizing a load when said power demand signal is on one side of said threshold and of energizing a load when said power demand signal is on another side of said threshold.

9. A demand control system for maintaining power consumption of loads within a building below an upper demand limit, said upper demand limit being separated from a lower demand limit by a deadband, said system comprising:

power demand controller means responsive to said power consumption for providing a controller output signal ramping in a first direction when said power consumption is above said upper demand limit, remaining substantially constant when said power consumption is between said upper and lower demand limits, and ramping in a second direction when said power consumption is below said lower demand limit; p1 a communication channel connected to said power demand controller for carrying said signal; and, a plurality of demand load controlling means each of which has associated therewith a threshhold value of said controller output signal and at least one other required function, and each of which has at least an energization state and a deenergization state, each of said demand load controlling means entering said deenergization state when said controller output signal is on a first side of said threshhold associated with said demand load controlling means and said at least one other required function associated therewith is met and entering said energization state at other times.

* * * * *